US012801492B2

(12) United States Patent
Eickel

(10) Patent No.: US 12,801,492 B2
(45) Date of Patent: Nov. 17, 2026

(54) DATA STORAGE CIRCUIT

(71) Applicant: Dream CHIP Technologies GmbH, Garbsen (DE)

(72) Inventor: Karl Heinz Eickel, Bremen (DE)

(73) Assignee: Dream CHIP Technologies GmbH, Garbsen (DE)

( * ) Notice: Subject to any disclaimer, the term of this patent is extended or adjusted under 35 U.S.C. 154(b) by 0 days.

(21) Appl. No.: 18/579,725

(22) PCT Filed: Mar. 21, 2022

(86) PCT No.: PCT/EP2022/057314
§ 371 (c)(1),
(2) Date: Jan. 16, 2024

(87) PCT Pub. No.: WO2023/179839
PCT Pub. Date: Sep. 28, 2023

(65) Prior Publication Data

US 2025/0021433 A1 Jan. 16, 2025

(51) Int. Cl.
*G06F 11/10* (2006.01)

(52) U.S. Cl.
CPC ...... *G06F 11/1068* (2013.01); *G06F 11/1016* (2013.01)

(58) Field of Classification Search
None
See application file for complete search history.

(56) References Cited

U.S. PATENT DOCUMENTS

| | | | | |
|---|---|---|---|---|
| 8,766,662 | B1 | 7/2014 | Wright | |
| 2019/0227867 | A1* | 7/2019 | Ellur | H03M 13/098 |
| 2021/0303393 | A1* | 9/2021 | Eckhardt | G06F 11/1004 |

FOREIGN PATENT DOCUMENTS

| | | | |
|---|---|---|---|
| EP | 0013885 | B1 | 8/1984 |

OTHER PUBLICATIONS

International Search Report from corresponding International Patent Application No. PCT/EP22/57314, dated Oct. 21, 2022.

* cited by examiner

*Primary Examiner* — Mark D Featherstone
(74) *Attorney, Agent, or Firm* — Renner, Otto, Boisselle & Sklar, LLP

(57) ABSTRACT

The invention discloses a data storage circuit comprising a plurality of configuration registers provided to store configuration data, an error detection unit arranged to detect errors in the configuration data after storing configuration data in the respective configuration register and/or when checking the stored configuration data from the respective configuration register. A plurality of error detection units is provided as well, wherein each configuration register is connected to a respective error detection unit to form pairs of related functional units, or wherein a set of the same bit positions in the configuration registers is connected to a respective error detection unit to form pairs of related functional units.

11 Claims, 5 Drawing Sheets

| | | | | | | | | | | | | | |
|---|---|---|---|---|---|---|---|---|---|---|---|---|---|
| P0 | = | CONFIG_REG_0[0] | ^ | CONFIG_REG_1[0] | ^ | CONFIG_REG_2[0] | ^ | CONFIG_REG_3[0] | ^ | CONFIG_REG_4[0] | ......... | ^ | CONFIG_REG_n[0] |
| P1 | = | CONFIG_REG_0[1] | ^ | CONFIG_REG_1[1] | ^ | CONFIG_REG_2[1] | ^ | CONFIG_REG_3[1] | ^ | CONFIG_REG_4[1] | ......... | ^ | CONFIG_REG_n[1] |
| P2 | = | CONFIG_REG_0[2] | ^ | CONFIG_REG_1[2] | ^ | CONFIG_REG_2[2] | ^ | CONFIG_REG_3[2] | ^ | CONFIG_REG_4[2] | ......... | ^ | CONFIG_REG_n[2] |
| P3 | = | CONFIG_REG_0[3] | ^ | CONFIG_REG_1[3] | ^ | CONFIG_REG_2[3] | ^ | CONFIG_REG_3[3] | ^ | CONFIG_REG_4[3] | ......... | ^ | CONFIG_REG_n[3] |
| P4 | = | CONFIG_REG_0[4] | ^ | CONFIG_REG_1[4] | ^ | CONFIG_REG_2[4] | ^ | CONFIG_REG_3[4] | ^ | CONFIG_REG_4[4] | ......... | ^ | CONFIG_REG_n[4] |
| P5 | = | CONFIG_REG_0[5] | ^ | CONFIG_REG_1[5] | ^ | CONFIG_REG_2[5] | ^ | CONFIG_REG_3[5] | ^ | CONFIG_REG_4[5] | ......... | ^ | CONFIG_REG_n[5] |
| P6 | = | CONFIG_REG_0[6] | ^ | CONFIG_REG_1[6] | ^ | CONFIG_REG_2[6] | ^ | CONFIG_REG_3[6] | ^ | CONFIG_REG_4[6] | ......... | ^ | CONFIG_REG_n[6] |
| P7 | = | CONFIG_REG_0[7] | ^ | CONFIG_REG_1[7] | ^ | CONFIG_REG_2[7] | ^ | CONFIG_REG_3[7] | ^ | CONFIG_REG_4[7] | ......... | ^ | CONFIG_REG_n[7] |
| P8 | = | CONFIG_REG_0[8] | ^ | CONFIG_REG_1[8] | ^ | CONFIG_REG_2[8] | ^ | CONFIG_REG_3[8] | ^ | CONFIG_REG_4[8] | ......... | ^ | CONFIG_REG_n[8] |
| P9 | = | CONFIG_REG_0[9] | ^ | CONFIG_REG_1[9] | ^ | CONFIG_REG_2[9] | ^ | CONFIG_REG_3[9] | ^ | CONFIG_REG_4[9] | ......... | ^ | CONFIG_REG_n[9] |
| P10 | = | CONFIG_REG_0[10] | ^ | CONFIG_REG_1[10] | ^ | CONFIG_REG_2[10] | ^ | CONFIG_REG_3[10] | ^ | CONFIG_REG_4[10] | ......... | ^ | CONFIG_REG_n[10] |
| P11 | = | CONFIG_REG_0[11] | ^ | CONFIG_REG_1[11] | ^ | CONFIG_REG_2[11] | ^ | CONFIG_REG_3[11] | ^ | CONFIG_REG_4[11] | ......... | ^ | CONFIG_REG_n[11] |
| P12 | = | CONFIG_REG_0[12] | ^ | CONFIG_REG_1[12] | ^ | CONFIG_REG_2[12] | ^ | CONFIG_REG_3[12] | ^ | CONFIG_REG_4[12] | ......... | ^ | CONFIG_REG_n[12] |
| P13 | = | CONFIG_REG_0[13] | ^ | CONFIG_REG_1[13] | ^ | CONFIG_REG_2[13] | ^ | CONFIG_REG_3[13] | ^ | CONFIG_REG_4[13] | ......... | ^ | CONFIG_REG_n[13] |
| P14 | = | CONFIG_REG_0[14] | ^ | CONFIG_REG_1[14] | ^ | CONFIG_REG_2[14] | ^ | CONFIG_REG_3[14] | ^ | CONFIG_REG_4[14] | ......... | ^ | CONFIG_REG_n[14] |
| P15 | = | CONFIG_REG_0[15] | ^ | CONFIG_REG_1[15] | ^ | CONFIG_REG_2[15] | ^ | CONFIG_REG_3[15] | ^ | CONFIG_REG_4[15] | ......... | ^ | CONFIG_REG_n[15] |
| P16 | = | CONFIG_REG_0[16] | ^ | CONFIG_REG_1[16] | ^ | CONFIG_REG_2[16] | ^ | CONFIG_REG_3[16] | ^ | CONFIG_REG_4[16] | ......... | ^ | CONFIG_REG_n[16] |
| P17 | = | CONFIG_REG_0[17] | ^ | CONFIG_REG_1[17] | ^ | CONFIG_REG_2[17] | ^ | CONFIG_REG_3[17] | ^ | CONFIG_REG_4[17] | ......... | ^ | CONFIG_REG_n[17] |
| P18 | = | CONFIG_REG_0[18] | ^ | CONFIG_REG_1[18] | ^ | CONFIG_REG_2[18] | ^ | CONFIG_REG_3[18] | ^ | CONFIG_REG_4[18] | ......... | ^ | CONFIG_REG_n[18] |
| P19 | = | CONFIG_REG_0[19] | ^ | CONFIG_REG_1[19] | ^ | CONFIG_REG_2[19] | ^ | CONFIG_REG_3[19] | ^ | CONFIG_REG_4[19] | ......... | ^ | CONFIG_REG_n[19] |
| P20 | = | CONFIG_REG_0[20] | ^ | CONFIG_REG_1[20] | ^ | CONFIG_REG_2[20] | ^ | CONFIG_REG_3[20] | ^ | CONFIG_REG_4[20] | ......... | ^ | CONFIG_REG_n[20] |
| P21 | = | CONFIG_REG_0[21] | ^ | CONFIG_REG_1[21] | ^ | CONFIG_REG_2[21] | ^ | CONFIG_REG_3[21] | ^ | CONFIG_REG_4[21] | ......... | ^ | CONFIG_REG_n[21] |
| P22 | = | CONFIG_REG_0[22] | ^ | CONFIG_REG_1[22] | ^ | CONFIG_REG_2[22] | ^ | CONFIG_REG_3[22] | ^ | CONFIG_REG_4[22] | ......... | ^ | CONFIG_REG_n[22] |
| P23 | = | CONFIG_REG_0[23] | ^ | CONFIG_REG_1[23] | ^ | CONFIG_REG_2[23] | ^ | CONFIG_REG_3[23] | ^ | CONFIG_REG_4[23] | ......... | ^ | CONFIG_REG_n[23] |
| P24 | = | CONFIG_REG_0[24] | ^ | CONFIG_REG_1[24] | ^ | CONFIG_REG_2[24] | ^ | CONFIG_REG_3[24] | ^ | CONFIG_REG_4[24] | ......... | ^ | CONFIG_REG_n[24] |
| P25 | = | CONFIG_REG_0[25] | ^ | CONFIG_REG_1[25] | ^ | CONFIG_REG_2[25] | ^ | CONFIG_REG_3[25] | ^ | CONFIG_REG_4[25] | ......... | ^ | CONFIG_REG_n[25] |
| P26 | = | CONFIG_REG_0[26] | ^ | CONFIG_REG_1[26] | ^ | CONFIG_REG_2[26] | ^ | CONFIG_REG_3[26] | ^ | CONFIG_REG_4[26] | ......... | ^ | CONFIG_REG_n[26] |
| P27 | = | CONFIG_REG_0[27] | ^ | CONFIG_REG_1[27] | ^ | CONFIG_REG_2[27] | ^ | CONFIG_REG_3[27] | ^ | CONFIG_REG_4[27] | ......... | ^ | CONFIG_REG_n[27] |
| P28 | = | CONFIG_REG_0[28] | ^ | CONFIG_REG_1[28] | ^ | CONFIG_REG_2[28] | ^ | CONFIG_REG_3[28] | ^ | CONFIG_REG_4[28] | ......... | ^ | CONFIG_REG_n[28] |
| P29 | = | CONFIG_REG_0[29] | ^ | CONFIG_REG_1[29] | ^ | CONFIG_REG_2[29] | ^ | CONFIG_REG_3[29] | ^ | CONFIG_REG_4[29] | ......... | ^ | CONFIG_REG_n[29] |
| P30 | = | CONFIG_REG_0[30] | ^ | CONFIG_REG_1[30] | ^ | CONFIG_REG_2[30] | ^ | CONFIG_REG_3[30] | ^ | CONFIG_REG_4[30] | ......... | ^ | CONFIG_REG_n[30] |
| P31 | = | CONFIG_REG_0[31] | ^ | CONFIG_REG_1[31] | ^ | CONFIG_REG_2[31] | ^ | CONFIG_REG_3[31] | ^ | CONFIG_REG_4[31] | ......... | ^ | CONFIG_REG_n[31] |

Fig. 4

DATA STORAGE CIRCUIT

FIELD OF THE INVENTION

The invention relates to a data storage circuit comprising a plurality of configuration registers provided to store configuration data, an error detection unit arranged to detect errors in the configuration data after storing configuration data in the respective configuration register and/or when checking the stored configuration data from the respective configuration register.

BACKGROUND OF THE INVENTION

Memories and registers must be protected according to ISO standard 26262 against permanent and transient faults in safety critical applications. Therefore, it has been the state of the art for many years to implement safety mechanisms to detect and report such faults.

EP 0 013 885 B1 discloses a method for preventing undesired parity error signal in a parity check of a register. The data field in a register is provided to store a data byte including the related parity bit. In order to provide a more flexible method, the register field has an associated parity bit latch arrangement with one respective further parity bit position for a register into which, prior to the parity check, a digital bit is read in.

In contrast to registers that only store data temporarily, configuration registers are usually only written once and configure important functions in their system on a chip (SoC). Therefore, errors that occur in these configuration registers would have fatal consequences regarding functional safety according to ISO 26262.

In a system on a chip, registers are normally written with data via a system bus. If these registers are to be protected, a parity bit is generated via the write data and the register is expanded by this parity bit, which is written into the register with the write data.

When reading the register, the read out data and the read out parity bit are checked by a parity checker. An error signal PERR is set for each one-bit error that occurs in the register data or the parity bit that has been read.

SUMMARY OF THE INVENTION

The present invention provides an improved data storage circuit allowing detection of multiple faults in a configuration register due to a hardware fault or due to an unintended write of the configuration register.

In accordance with the present invention, a plurality of error detection units is provided, wherein each configuration register is connected to a respective error detection unit to form pairs of related functional units, or wherein a set of the same bit positions in the configuration registers is connected to a respective error detection unit to form pairs of related functional units.

In case that a parity bit generated for respective configuration data is written into a configuration register together with the related configuration data, an error detection unit is connected downstream of each configuration register. The register data and the read out parity bit are checked in each cycle by the related error detection unit (parity checker). An error signal is set for each one-bit error that occurs in the register or the parity bit that has been read. This allows to recognise occurring errors automatically in real time without software overhead. The configuration registers are protected against one-bit errors by generating a parity bit via the write data and expanding the configuration register by this parity bit, which is written into the register with the write configuration data.

The advantage of this is that the register data are automatically checked in every cycle without software overhead and errors are detected in real time. An error correction code could be used as an extension of this procedure in order to be able to detect two-bit errors.

As an alternative, a set of the same bit positions in the configuration registers can be connected to a respective error detection unit to form pairs of related functional units. Again, a set of error detection units is connected downstream of each configuration register so that each error detection unit is connected to a specific bit position of the bits in the set of configuration registers. This allows to check the register data automatically in every cycle without software overhead to detect all multiple-bit errors.

A parity generation unit can be provided to generate a parity bit for configuration data, wherein the data storage circuit is arranged to store the generated parity bit together with a related configuration data in the respective configuration register. The error detection units are arranged to read out the stored parity bit in the related configuration data, to recalculate the parity bit for the read out configuration data and to compare the stored parity bit with the recalculated parity bit in order to detect an error in the read out configuration data or the read out parity bit.

Thus, the configuration registers are expanded by the parity bit generated for the configuration data stored in the respective configuration register. When reading the stored parity bit and the related configuration data, the error detection unit is able to detect multiple faults in the configuration register. Such multiple faults can arise, e.g. due to a hardware fault or due to an unintended write to the configuration register. The fault detection can be carried out by recalculating the parity bit for the configuration data, which are read out, and to compare the stored parity bit, which is read out from the configuration data together with the related configuration data, with the recalculated parity bit in order to detect an error in the read out configuration data or the read out parity bit.

The plurality of error detection units, which are each provided for a related configuration register, allows a parity check in real time.

The error detection units can also be arranged to detect errors by use of an error correction code. The error correction code can be the parity bit or a more complex code, which may allow correction of a detected error.

The error detection unit can be designed to comprise:

- a parity generation unit provided to generate a parity bit for a set of the bit in the same positions of the set of configuration registers,
- a parity bit storage unit provided to store a respective parity bit generated by the related parity generation unit, and
- a parity check unit for comparing the parity bit generated by the parity generation unit and the stored parity bit previously generated and stored in the parity bit storage unit in order to detect an error in the configuration data.

This allows to recognise every error, including multiple errors in real time.

The plurality of error detection units connected downstream of the configuration registers each combines the same bit positions from the outputs of all configuration registers. Thus, each bit position in all configuration registers of the set of the configuration registers are combined to a related parity generation unit to generate a parity bit for the set of bits of all configuration registers in the same bit position.

The parity bits are stored at the end of the write cycle of the configuration data, once when all configuration registers or a part of the configuration registers have been written with configuration data. The write cycle can be finished after the set of configuration registers has been modified with the desired configuration data. This does not necessarily require writing all configuration registers with the respective configuration data. It is sufficient to amend only those configuration data in the respective configuration registers, which do not correspond to the desired configuration data.

When checking configuration data from the configuration registers, a parity check unit compares a parity bit generated by the parity generation unit for the read out configuration data and the stored parity bit previously generated and stored in the parity bit storage unit in order to detect an error in the configuration data.

Again, a parity generation unit forms a functional unit together with a set of the same bit positions in the set of configuration registers. The same is true for the parity bit storage units provided to store a respective parity bit of a set of bits in the configuration registers having the same bit position.

This data storage circuit can be easily implemented and allows real time detection of multiple-bit errors.

The data storage unit can be arranged to store the parity bits generated by the parity generation unit in the respective parity bit storage unit directly after all configuration registers or part of it have been written with configuration data. Thus, a generation of parity bits can be performed at a time when all configuration data is available and stored in the configuration registers in the set of configuration registers.

The parity bit storage unit can be formed by a Flip-Flop provided for the set of error detection units. It is also possible to make use of a register or any other suitable data memory for storing the parity bits.

The error detection unit can be arranged to provide an error flag at the output of the error detection unit. Thus, each of the error detection units provides a respective error flag indicating an error when comparing a stored parity bit for a set of bits of the same bit positions of a set of configuration data to a recalculated parity bit for the set of bits of the same bit positions when reading configuration data from the configuration registers.

Unintended writing of at least one of the configuration registers CONFIG_REG_i can be prohibited by use of a gated clock clk_cfg for the configuration registers CONFIG_REG_i to allow writing of control data into the respective configuration register CONFIG_REG_i only in case that the clock clk_cfg is enabled.

A clock gate CG2 can be provided to generate the clock signal clk_cfg from a system clock signal and a configuration active signal CACT at the input of the clock gate CG2. A configuration active register CACT_REG is provided to store the configuration active signal CACT for an intended write cycle.

After configuration the configuration active signal CACT in the configuration active register CACT_REG will be set to "0" with the consequence that all unintended accesses to one of the configuration registers CONFIG_REG_i are prohibited.

BRIEF DESCRIPTION OF THE DRAWINGS

The invention is explained in more detail by way of exemplary embodiments in the enclosed drawings. It shows:

FIG. 4—table of the parity bits calculated from the bit of the same bit positions of the configuration registers;

DETAILED DESCRIPTION OF THE INVENTION

In the following, the bit width of 32 bits (i.e. register width) is an example only. The data storage unit can be designed for any other bit width and respective width of register accordingly without departing from the technical solution.

Figure 1:
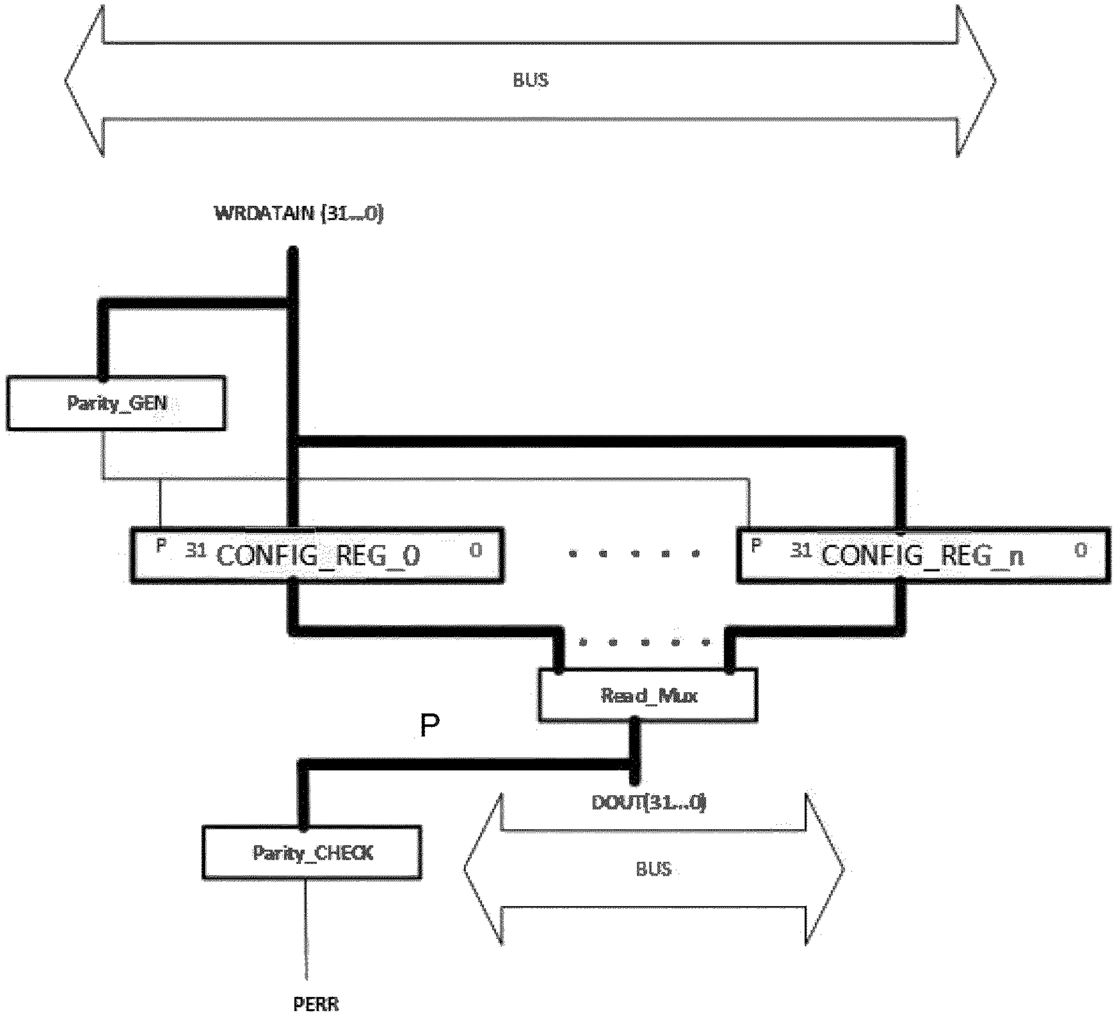
FIG. 1—block diagram of a conventional data storage unit according to the prior art.

FIG. 1 shows a block diagram of a conventional data storage unit according to prior art. Configuration data are written via a data bus BUS, wherein the configuration data WRDATAIN (31 . . . 0) are fed into a parity generator Parity_GEN to generate a parity bit P from the configuration data. Further, the configuration data WRDATAIN (31 . . . 0) are written into a respective configuration register CONFIG_REG_0, . . . , CONFIG_REG_n. The configuration registers CONFIG_REG_0, . . . , CONFIG_REG_n can be accessed by respective individual register addresses. Each of the configuration registers comprises a storage capacity for the bits of the configuration data, e.g. bit 0 . . . 31. Further, the parity bit P generated by the parity generator for the respective configuration data WRDATAIN (31 . . . 0) is written into the respective configuration register CONFIG_REG_i.

When reading configuration data out of the respective configuration registers CONFIG_REG_i, the configuration data are provided to a data bus BUS. The read-out configuration data DOUT (31 . . . 0) is further transferred to a parity check unit Parity_CHECK. The parity check unit Parity_CHECK is arranged to recalculate the parity bit for the configuration data DOUT (31 . . . 0) and to compare this recalculated parity bit with the parity bit P, which is also read from the configuration register CONFIG_REG_i. In case of a mismatch between the stored and read out parity bit P and the recalculated parity bit, an error flag PERR_i is set at the output of the parity check unit Parity_CHECK.

The selection of the configuration register CONFIG_REG_i for reading out configuration data DOUT (31 . . . 0) is performed by a multiplexer Read_Mux. Each configuration register CONFIG_REG_i is connected to a respective input of the multiplexer Read_Mux, wherein the output of the multiplexer Read_Mux is connected to the output data bus BUS and the parity check unit Parity_Check.

Figure 2:
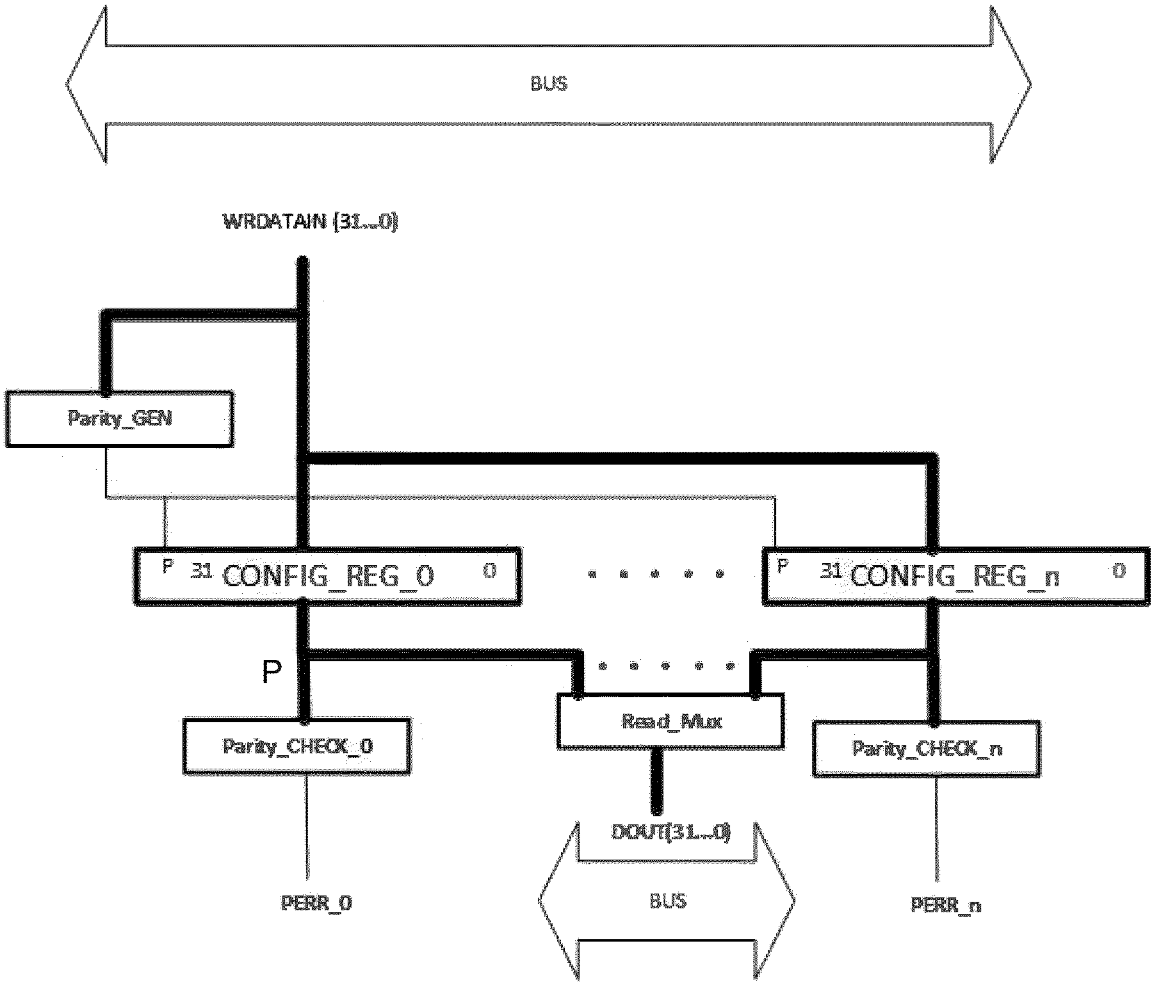
FIG. 2—block diagram of a first embodiment of a data storage circuit comprising an error detection unit for each configuration register.

FIG. 2 shows a first embodiment of a data storage unit also comprising a bus for carrying the configuration data. The bus is connected to a set of configuration registers CONFIG_REG_0, . . . , CONFIG_REG_n to store configuration data WRDATAIN (31 . . . 0) into a respective assigned configuration register CONFIG_REG_i.

Again, a parity generation unit Parity_GEN is provided to generate a parity bit for the configuration data WRDATAIN (31 . . . 0) in order to write the respective parity bit P into the related configuration register CONFIG_REG_i together with the related configuration data WRDATAIN (31 . . . 0).

This corresponds to the conventional data storage unit shown in FIG. 1.

For reading configuration data out of the configuration registers CONFIG_REG_i, the input of the multiplexer Read_Mux is again connected to a respective configuration register CONFIG_REG_i in order to transfer the configuration data DOUT (31 . . . 0) from a configuration register CONFIG_REG_i to a data bus BUS.

The parity check for one selected configuration register CONFIG_REG_i can also be performed in the Bus-System.

Downstream, i.e. at the output of each configuration register CONFIG_REG_i, an error detection unit Parity_CHECK_i is provided to read the stored parity bit P in the respective configuration register CONFIG_REG_i and to recalculate the parity bit from the stored and read out configuration data DOUTi (31 . . . 0), which is stored in the respective configuration register CONFIG_REG_i. Each error detection unit can be designed in the form of a check unit Parity_CHECK_i to compare the parity bits P stored in the configuration register CONFIG_REG_i with the recalculated parity bit and to provide a parity error flag PERR_i at the output of the error detection unit Parity_Check.

This allows to indicate a set of parity error flags PERR_i for each of the configuration registers CONFIG_REG_i in real time without any software support. Only one bit errors will be detected using Parity-Bit, but also an ECC-Code can be used to detect 2-Bit errors.

Figure 3:
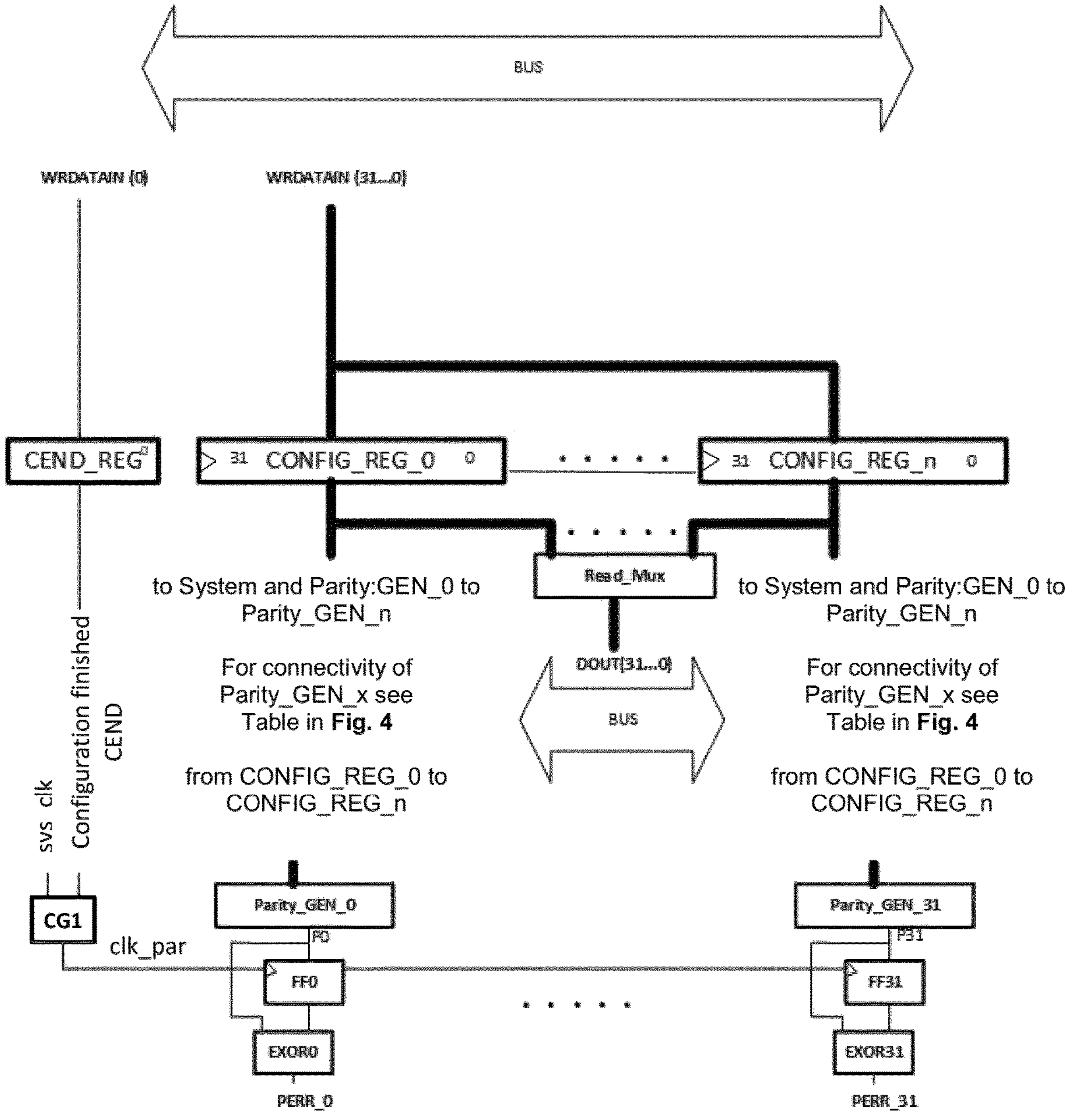
FIG. 3—block diagram of a second embodiment of the data storage unit.

FIG. 3 shows a second embodiment of the data storage circuit allowing a detection of multiple-bit errors.

Again, the configuration registers CONFIG_REG_i are connected to a data bus BUS in order to write configuration data WRDATAIN (31 . . . 0) provided on the data bus into the respective assigned configuration register CONFIG_REG_i. The configuration registers CONFIG_REG_i comprise a storage capacity for the bits of the configuration data, e.g. 0-31 for 32 bit. The invention is not restricted to this example of 32 bit and can be used for any other bit length of configuration data.

After a set of configuration data is written into configuration registers CONFIG_REG_i, the end of this write cycle is indicated by a bit WRDATAIN (0), which is transferred to a bit register CEND_REG. This indicates that the write cycle is finalized, that means that all or a part of the configuration registers are written so that all configuration data is available in the set of configuration registers. By use of a clock gate CG1 with a system clock signal sys_clock and the bit provided with the configuration end signal CEND from the configuration end register CEND_REG as input, the output of this clock gate CG1 provides a clock clk_par for writing the parity bit storage unit.

The configuration end signal CEND is only active for one cycle because it is built from the respective WE signal (write enable) of the configuration end register CEND_REG and the bit error detection unit.

A set of error detection units, where each comprises a parity generation unit Parity_GEN_i, allows to generate a parity bit for a set of bits of the same bit positions in the set of configuration registers CONFIG_REG_0, . . . , CONFIG_REG_n. Thus, the parity bit of the first bit of all configuration data stored in the configuration registers CONFIG_REG_0-n is calculated and provided at the output of the respective parity generator unit Parity_GEN_i for the respective bit position. For example, the parity bit generation unit Parity_GEN_0 is connected to the first bit position of all configuration registers CONFIG_REG_0-n, whereas a parity generation unit Parity_GEN_31 is connected to the 31th bit position of all configuration registers CONFIG_REG_0-n.

The output of each parity generation unit Parity_GEN_i is connected to a respective storage unit, e.g. Flip-Flops F0, . . . , FF31, which will store the recalculated Parity-Bits, with CEND only.

The respective storage units FF0, . . . . FF31 are controlled by the clock clk_par to store the respective parity bit generated by the related parity generation unit Parity_GEN_i once a write cycle is finished and the last configuration register CONFIG_REG_n to be written in the write cycle was written with new configuration data.

The output of each storage unit FFi is connected to a related parity check unit EXOR0, . . . , EXORi, . . . , EXOR31 (Exclusive OR) to compare the parity bit provided at the output of the related parity generation unit Parity_GEN_i and the parity bit stored in the parity bit storage unit FFi. For example, the parity check unit Parity_CHECK can be designed as an EXOR gate. The output is an error flag PERR_i.

The parity generation unit Parity GEN_i is (hard-wired) connected to the output of the set of configuration registers CONFIG_REG_i. The configuration data stored in the respective configuration registers CONFIG_REG_i is, due to the hard-wired connection—at all times—present as digital information (High- or Low-Voltage) at the input of the parity generation unit Parity GEN_i. The parity check can be performed in real time, whenever a configuration register changes. The stored configuration data are always present at the input of the parity generation units Parity_GEN_i due to the hard-wired connection. The parity generation units Parity_GEN_i are able to provide a respective parity bit Pi at their respective output by combining the set of input bits selected from the configuration data, e.g. as shown in FIG. 4. Thus, each time any bit in the configuration data stored in the configuration registers CONFIG_REG_0 to CONFIG_REG_n changes by fault or new writing of configuration data into at least on configuration register CONFIG_REG_i, at least one parity bit Pi changes so that the change can be detected in real time.

The storing of the previously generated parity bits Pi in the Flip Flops FFi safeguards the configuration registers CONFIG_REG_i against faults and unintended write actions of the configuration registers CONFIG_REG_i.

FIG. 4 presents a table of the relationship of the parity bits P0, P1, . . . , P31 provided for each of the bit positions 0, i, . . . , 31. Each parity bit is calculated by combining the bits of the same bit positions in all of the configuration registers CONFIG_REG_0, . . . , n.

For example, the parity bit P0 for the bit position zero is calculated from the bit position 0 of all of the configuration registers CONFIG_REG_0 (000), CONFIG_REG_1 (0), CONFIG_REG_2 (0), . . . , CONFIG_REG_n (0).

The parity bit P31 for the last bit position 31 is calculated from the 31th bit in all the configuration registers CONFIG_REG_0 (31), CONFIG_REG_1 (31), . . . , CONFIG_REG_n (31).

Figure 5:
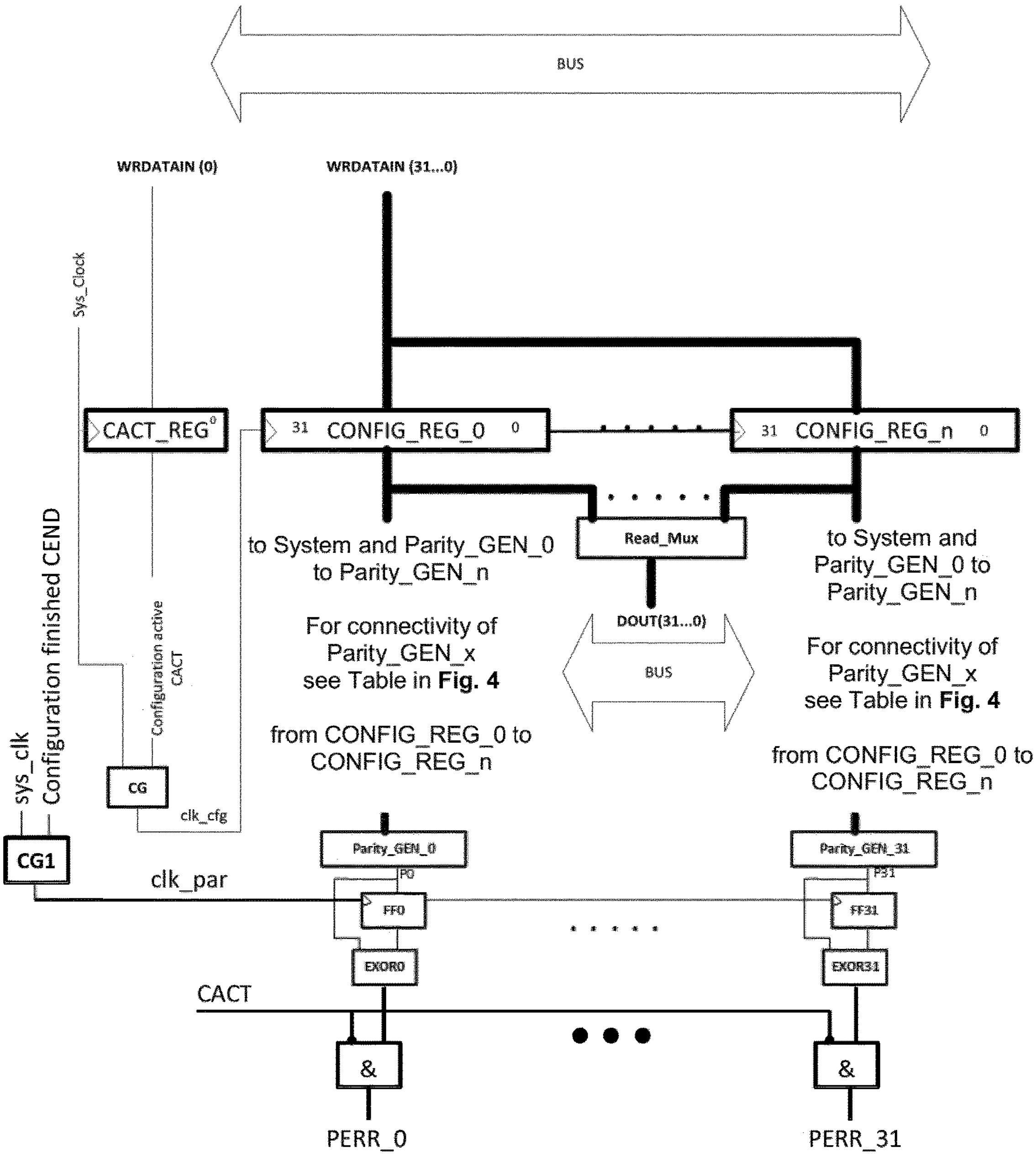
FIG. 5—block diagram of a third embodiment of the data storage unit.

FIG. 5 shows a block diagram of a third embodiment of the data storage unit. The design provided for the parity check by use of the parity generation units Parity_GEN_i and Flip-Flop units FFi corresponds to the first embodiment shown in FIG. 2 or, as exemplarily illustrated, to the second embodiment shown in FIG. 3.

Writing of the configuration registers CONFIG_REG_i necessarily requires a write clock signal clk_cfg at a respective clock input of the configuration registers CONFI- G_REG_0 to CONFIG_REG_n, with n as integer number of the maximum number of configuration registers. The write clock signal clk_cfg is generated at the output of a clock gate CG2 from a system clock signal sys_clock and a configuration active CACT signal at the input of the clock gate CG2.

The configuration active register CACT_REG is connected to a data bus BUS to write WRDATAIN (i) provided on the data bus into the respective assigned configuration active register CACT_REG.

For example the first bit WRDATAIN (0) is used to set configuration active signal CACT in the configuration active register CACT_REG.

During an active CACT signal the configuration registers CONFIG_REG_i can be modified, because clock signal clk_cfg is enabled.

During the configuration cycle the generation of error flags PERR_i can be gated by configuration active signal CACT.

After modification of all intended configuration registers, the configuration active signal CACT in the configuration active register CACT_REG shall be set to an inactive state.

Thus, unintended writing of at least one of the configuration registers CONFIG_REG_i is prohibited by gating the clock signal clk_cfg with an inactive configuration active signal CACT at clock gate CG2.

What is claimed is:

1. A data storage circuit comprising:

a plurality of configuration registers configured to store configuration data;

an error detection unit configured to detect errors in the configuration data at least one of:

after storing configuration data in the respective configuration register;

when checking the stored configuration data from the respective configuration register; and a plurality of error detection units, wherein each configuration register is connected to a respective error detection unit to form pairs of related functional units, or wherein a set of the same bit positions in the configuration registers is connected to a respective error detection unit to form pairs of related functional units.

2. The data storage circuit according to claim 1, comprising a parity generation unit configured to generate a parity bit for configuration data, wherein the data storage circuit is configured to store the generated parity bit together with a related configuration data in the respective configuration register, wherein the error detection units are configured to read out the stored parity bit and the related configuration data, to recalculate the parity bit for the read out configuration data and to compare the stored parity bit with the recalculated parity bit in order to detect an error in the read out configuration data or the read out parity bit.

3. The data storage circuit according to claim 1, wherein the error detection units are configured to detect errors by use of an error correction code.

4. The data storage circuit according to claim 1, wherein each error detection unit comprises a parity generation unit provided to generate a parity bit for a set of the bits in the same positions of the set of configuration registers, a parity bit storage unit provided to store a respective parity bit (P) generated by the related parity generation unit, a parity check unit for comparing the parity bit generated by the parity generation unit and the stored parity bit previously generated and stored in the parity bit storage unit in order to detect an error in the configuration data.

5. The data storage circuit according to claim 1, wherein each error detection unit is configured to provide an error flag at the output of each of the error detection units.

6. The data storage circuit according to claim 1, wherein the configuration registers comprise a configuration clock input to allow writing of control data into the respective configuration register, wherein a clock gate is provided to generate said clock signal from a system clock signal and a configuration active signal at the input of the clock gate, and wherein a configuration active register is provided to store the configuration active signal for an intended write cycle.

7. The data storage unit according to claim 4, wherein the data storage circuit is configured to store the parity bit generated by the parity generation unit in the respective parity bit storage unit once in a write cycle directly after all configuration registers or a part of the configuration registers have been written with configuration data.

8. The data storage circuit according to claim 4, wherein the parity bit storage unit is formed by a Flip-Flop provided for the set of error detection units.

9. The data storage unit according to claim 7, comprising a clock gate configured to generate a clock signal from a system clock signal and a configuration end signal at the input of the clock gate, and a configuration end register configured to store the configuration end signal for exactly one cycle.

10. The data storage circuit according to claim 5, wherein each error detection unit is configured to provide an error flag at the output of each of the error detection units only if a configuration active signal is inactive, wherein an active configuration active signal indicates a running write cycle and an inactive configuration active signal indicates a termination of a write cycle.

11. The data storage circuit according to claim 10, comprising an AND-gate configured to disable the provision of error flags during configuration.

* * * * *